US006952898B2

(12) United States Patent
Castellon

(10) Patent No.: US 6,952,898 B2
(45) Date of Patent: Oct. 11, 2005

(54) GUIDE RAIL ADJUSTING DEVICE FOR A MOTOR VEHICLE POWER WINDOW ASSEMBLY

(76) Inventor: Melchor D. Castellon, Diputacion, 455-457, E-08013 Barcelona (ES)

( * ) Notice: Subject to any disclaimer, the term of this patent is extended or adjusted under 35 U.S.C. 154(b) by 0 days.

(21) Appl. No.: 10/483,076

(22) PCT Filed: May 6, 2003

(86) PCT No.: PCT/ES03/00198

§ 371 (c)(1),
(2), (4) Date: Jan. 8, 2004

(87) PCT Pub. No.: WO03/100202

PCT Pub. Date: Dec. 4, 2003

(65) Prior Publication Data

US 2004/0187388 A1 Sep. 30, 2004

(30) Foreign Application Priority Data

May 23, 2002 (ES) ..................................... 200201328 U

(51) Int. Cl.[7] .............................................. E05F 15/16
(52) U.S. Cl. ............................................ 49/349; 49/374
(58) Field of Search ......................... 49/348, 349, 350, 49/351, 374, 502; 403/408.1

(56) References Cited

U.S. PATENT DOCUMENTS

| 3,093,404 | A | * | 6/1963 | Probst | ........................ 49/211 |
|---|---|---|---|---|---|
| 3,591,983 | A | | 7/1971 | Hanson | |
| 3,844,064 | A | * | 10/1974 | Yamaha et al. | ................ 49/348 |
| 4,303,362 | A | * | 12/1981 | Lockhart | ..................... 411/153 |
| 4,796,930 | A | * | 1/1989 | Baynes | ........................ 292/58 |
| 4,964,238 | A | * | 10/1990 | Nishijima et al. | ............. 49/352 |
| 5,581,947 | A | * | 12/1996 | Kowall et al. | ................. 49/451 |
| 5,694,719 | A | * | 12/1997 | Bejune et al. | ................. 49/502 |
| 5,836,844 | A | * | 11/1998 | Yoshida | ........................ 474/80 |
| 5,927,021 | A | * | 7/1999 | Kowalski et al. | ............. 49/502 |
| 6,019,012 | A | * | 2/2000 | Cartwright | .................... 74/409 |
| 6,029,403 | A | * | 2/2000 | Bertolini et al. | .............. 49/502 |
| 6,425,208 | B1 | * | 7/2002 | Klueger et al. | ................ 49/502 |
| 6,791,501 | B2 | * | 9/2004 | Maeda et al. | ................ 343/715 |

FOREIGN PATENT DOCUMENTS

FR            1079130            11/1954

* cited by examiner

*Primary Examiner*—Gregory J. Strimbu
(74) *Attorney, Agent, or Firm*—Dickstein, Shapiro, Morin & Oshinsky, LLP.

(57) ABSTRACT

An adjusting screw for adjusting the distance between a rail of a power window device and the lower portion of the door of the vehicle, threadeably extends through the rail of the power window device, a fixed nut being provided at one side of the rail, and a torsion spring is provided at the other side thereof whose ends are clamped against the rail, the adjusting screw threadably extending through the door of the vehicle and is axially retained in position relative to the door between two closing nuts. The torsion spring allows increasing the necessary torque to move the assembly so that movements of the rail towards or away from the door of the vehicle are carried out more accurately.

7 Claims, 1 Drawing Sheet

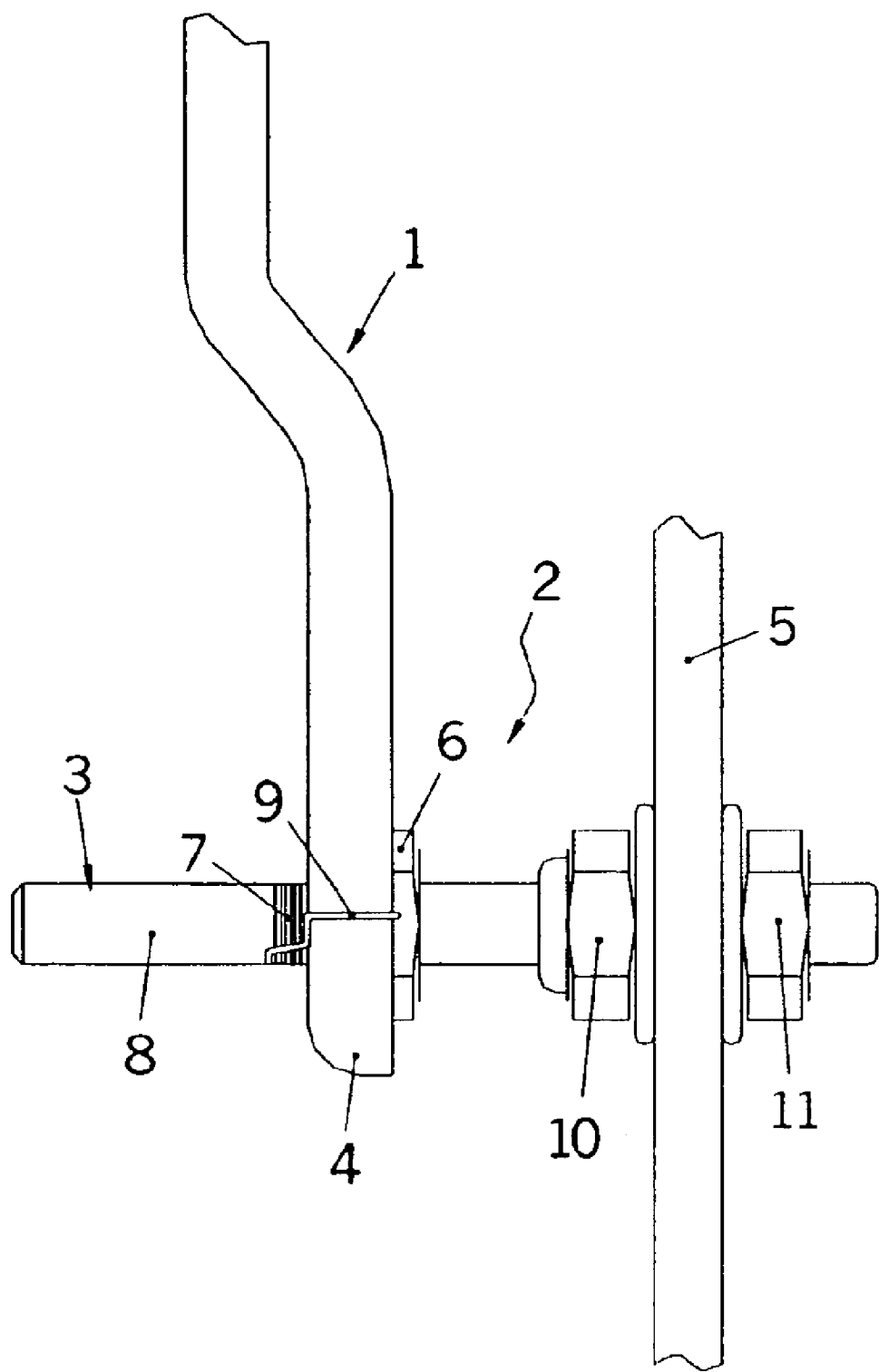

GUIDE RAIL ADJUSTING DEVICE FOR A MOTOR VEHICLE POWER WINDOW ASSEMBLY

BACKGROUND OF THE INVENTION

The present invention refers to a device that is part of the power window devices of motor vehicles by means of which it is possible to adjust the lateral distance between the device and the door of the vehicle. The device of the present invention may also be applied to other mechanisms that require an accurate adjustment of the relative distance between two elements.

The power window devices of the motor vehicles, whether they are manual or electric, comprise a movable window pane, driving means for the window pane and gripping means therefor. Said gripping means for the window pane includes at least one clamp which holds it through its lower edge and which is attached to a sliding member running along a guiding rail.

Both during the assembly process of the power window device and maintenance operations thereof, it is desirable to be allowed to appropriately adjust the position of the power window device relative to the door of the vehicle with the purpose of correcting errors and also to provide for the sealing conditions of the assembly.

There are other patents on devices for lateral adjusting of power window devices filed in the name of the same applicant which devices are capable to move the power window device in a direction perpendicular to the door, either in the assembling step or in operations of maintenance. Among others, the common feature to these devices is essentially the provision of a screw which turns to allow adjusting the distance between the rail of the power window device and the lower portion of the door.

DESCRIPTION OF THE INVENTION

In the present invention, said screw threadably extends through the rail support of the power window device or through a piece secured thereto. A fixed nut is provided at one end of said rail support or said piece thereof and a torsion spring is fitted at the other side surrounding the stem of the screw which ends are clamped against this rail support or against said piece thereof. Said screw threadably extends through the door of the vehicle or through a piece thereof which is caught between two closing nuts.

As it can be seen, a very simple device is possible that, when it is associated with the structure of the power window device of a vehicle, it provides many advantages. Provision of a torsion spring first increases the necessary torque to drive the assembly in displacement and therefore movements towards or away from the power window device relative to the door of the vehicle are carried out more accurately.

It should be also taken into account the fact that the torsion spring provides a continuous and stable resistive torque, which remains unaffected by the fatigue of the material, as opposed to the tightening devices using other means, such as nylon nuts and the like. According to the invention, as an elastic deformation of a spring occurs more movements may be thus achieved than when a plastic deformation takes place.

On the other hand, provision of said torsion spring in the device of the present invention considerably reduces noise in the mechanism caused by contact with and vibrations between metal parts such as the adjusting screw, the door and the rail of the power window device.

Therefore, two functions are performed by the spring due to its elastic nature. On one hand, the torque of the screw is increased, which makes the device more reliable, and on the other hand vibrations are damped and noise is reduced.

BRIEF DESCRIPTION OF THE DRAWING

The FIGURE shows a side view of a vehicle door including the adjusting device of the invention.

Further details and features of the improved device for lateral adjusting of power window devices in motor vehicles and the like of the present invention will be apparent from the following description, which refers to the accompanying drawing that schematically represents the preferred details. These details are given by way of example, which refer to a possible case of practical embodiment, but it is not limited to the disclosed details; therefore this description must be considered from a illustrating point of view and without any type of limitations.

A detailed list of the various parts cited in the present patent application is given below:

(1) rail of the power window device;
(2) device for lateral adjusting of power window devices;
(3) adjusting screw;
(4) lower end of the rail of the power window device;
(5) door of the vehicle;
(6) fixed nut;
(7) torsion spring;
(8) stem of the screw;
(9) ends of the torsion screw; and
(10, 11) closing nuts.

DESCRIPTION OF THE INVENTION

An embodiment of a device for lateral adjusting of a power window device is described hereinbelow by way of an example.

In the figure, a rail (1) of the power window device may be seen wherein the sliding member runs with the fastening clamp of the lower endge of the window (not shown).

The device of the invention, generally designated by reference numeral (2) comprises an adjusting screw schematically depicted at (3) in the figure.

The adjusting screw (3) extends through a hole in the lower end (4) of the rail (1) of the power window device and through a hole of the door (5) of the vehicle.

It should be noted that the rail (1) of the power window device may be made of a single piece, for example a plate welded thereto. Similarly, the door (5) of the vehicle may be made of a single piece too, for example a plate welded thereto.

A fixed nut (6) is provided at one side of the rail (1) and a torsion spring indicated at (7) in the figure is fitted at the other side.

The torsion spring (7) surrounding the stem (8) of the screw (3) and the ends (9) thereof are clamped against said rail (1) of the power window device so that said torsion spring (7) causes a resistive torque opposed to the rotating force exerted on the screw (3) to adjust the spacing distance between the rail (1) of the power window device and the door (5) of the vehicle.

Said door (5) is axially held relative to the screw (3) by means of respective nuts (10, 11).

The device (2) exhibits an extremely simple configuration by means of which movements towards or away from the power window device relative to the door (5) of the vehicle are carried out more accurately. Accordingly to the invention, it has been found that provision of a torsion spring (7) as described hereinbefore allows for a continuous and stable resisting torque that remains unaffected by the fatigue of the material after successive adjusting operations. Vibrations and noise are reduced in the power window device by said spring (7), and therefore it is very advantageous.

Once having been sufficiently described what the device of the present invention consists in accordance to the enclosed drawing, it is understood that any detail modification can be introduced as appropriate, provided that variations may alter the essence of the invention.

What is claimed is:

1. An assembly comprising:

a vehicle door;

a guide rail adapted to guide a movable window pane as the movable window pane moves between an open position disposed within the door and a closed position;

a rotatable adjustment screw connecting the rail to the door, the screw adapted to change a distance between the rail and the door when rotated; and a torsion spring having a body which at least partially surrounds the rotatable screw and having an end which contacts the rail, the spring applying a resistive torque to rotation of the screw.

2. The assembly of claim 1 wherein the rail has a hole and the rotatable screw passes through said hole.

3. The assembly of claim 2 wherein a portion of the screw which passes through the hole has threads.

4. The assembly of claim 3 wherein the torsion spring body at least partially surrounds the screw adjacent a first end of the hole in the rail.

5. The assembly of claim 4 wherein the rotatable screw passes through a nut adjacent a second end of the hole in the rail.

6. The assembly of claim 5 wherein the screw is axially retained in position relative to the door by a closing nut.

7. The assembly of claim 6 wherein the first end of the rail hole is disposed at a greater distance from the closing nut than the second end of the rail hole, and wherein the torsion spring body is disposed at the first end of the rail hole.

* * * * *